(12) United States Patent
Bigiavi et al.

(10) Patent No.: US 7,160,964 B2
(45) Date of Patent: Jan. 9, 2007

(54) LIQUID PHASE PROCESS FOR THE POLYMERIZATION OF α-OLEFINS

(75) Inventors: Daniele Bigiavi, Bologna (IT); Gabriele Mei, Ferrara (IT); Nicolo' Arich De Finetti, Ferrara (IT); Giuseppe Penzo, Mantova (IT); Gianni Vitale, Ferrara (IT); Massimo Covezzi, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/518,885

(22) PCT Filed: Jun. 17, 2003

(86) PCT No.: PCT/EP03/06348

§ 371 (c)(1),
(2), (4) Date: Dec. 20, 2004

(87) PCT Pub. No.: WO04/000895

PCT Pub. Date: Dec. 31, 2003

(65) Prior Publication Data

US 2005/0250917 A1    Nov. 10, 2005

Related U.S. Application Data

(60) Provisional application No. 60/408,196, filed on Sep. 4, 2002.

(30) Foreign Application Priority Data

Jun. 24, 2002   (EP) .................................. 02077543

(51) Int. Cl.
    *C08F 4/44*   (2006.01)
(52) U.S. Cl. .................. 526/142; 526/348; 526/348.6; 526/903; 526/124.3; 526/124.2; 526/124.1

(58) Field of Classification Search ................ 526/346, 526/348, 348.6, 903, 124.3, 124.2, 124.1, 526/142
    See application file for complete search history.

(56) References Cited

U.S. PATENT DOCUMENTS

| 4,399,054 A | 8/1983 | Ferraris et al. ......... 252/429 B |
| 4,551,509 A * | 11/1985 | Takayuki et al. ............. 526/68 |
| 4,634,744 A * | 1/1987 | Hwang et al. ................ 526/84 |
| 4,701,489 A | 10/1987 | Hughes et al. .............. 524/349 |
| 5,747,612 A | 5/1998 | Agapiou et al. ............. 526/82 |
| 6,281,302 B1 * | 8/2001 | Naga et al. ............. 526/124.3 |

FOREIGN PATENT DOCUMENTS

| DE | 1495070 | 10/1969 |
| DE | 1645282 | 7/1970 |
| EP | 0172961 | 5/1986 |
| EP | 0225099 | 6/1987 |
| EP | 0449519 | 10/1991 |

* cited by examiner

Primary Examiner—Ling-Sui Choi
(74) Attorney, Agent, or Firm—Jarrod N Raphael

(57) ABSTRACT

A liquid-phase process for polymerizing α-olefins of the formula $CH_2=CHR$, where R is H or an alkyl radical C1–C6, to produce a polymer that is soluble in the reaction medium, comprising the steps of: a) continuously polymerizing in liquid phase the α-olefin in the presence of a catalyst system based on a transition metal compound; b) continuously withdrawing from step a) a solution of polymer in the liquid reaction medium; c) mixing in one or more mixing stages said solution of polymer in the reaction medium with an organic deactivator having: at least a hydroxy group, a boiling point higher than 150° C., and a ratio between the molecular weight (MW) and the number of hydroxy groups (OH) comprised between 20 and 100.

24 Claims, 2 Drawing Sheets

LIQUID PHASE PROCESS FOR THE POLYMERIZATION OF α-OLEFINS

This application is the U.S. national phase of International Application PCT/EP2003/006348, filed Jun. 17, 2003, claiming priority to European Patent Application 02077543.3 filed Jun. 24, 2002, and the benefit under 35 U.S.C. 119(e) of U.S. Provisional Application No. 60/408,196, filed Sep. 4, 2002; the disclosures of International Application PCT/EP2003/006348, European Patent Application 02077543.3 and U.S. Provisional Application No. 60/408,1966, each as filed, are incorporated herein by reference.

The present invention relates to a liquid-phase process for the polymerization of α-olefins. In particular, it relates to a liquid-phase process for the polymerization of α-olefins, especially butene-1, followed by a post-polymerization step where the catalyst residues are deactivated with a high efficiency.

Butene-1 (co)polymers are well known in the art and are mainly used in the manufacture of molded products such as pipes, packaging films, adhesives.

Hitherto, butene-1 (co)polymers have been mainly produced by a solution or slurry polymerization process in the presence of coordination catalysts which are generally referred to as Ziegler-Natta catalysts. When a solution process is adopted, the polymerization is generally carried out in liquid butene-1 at conditions under which a solution of polybutene in butene-1 is discharged from the polymerization reactor. When a slurry polymerization is adopted, the polymerization is carried out in liquid butene-1 at conditions under which the polymer is produced as a solid, thus obtaining a slurry of solid polymer in butene-1. In both cases, an additional step is required wherein the obtained polymer is separated from the monomer, which is recovered and re-circulated to the reactor.

Several generations of Ziegler-Natta catalysts have been used in the production of isotactic polyolefins, such as polypropylene or polybutene. A former generation of Ziegler-Natta catalysts employed in the polymerization of butene-1 is based on $TiCl_3$ as the catalyst component. Butene-1 (co)polymers have been prepared by polymerizing butene-1 in the presence of $TiCl_3$-based catalysts and a dialkyl aluminum halide as the cocatalyst. In view of the relatively low activity of said catalyst systems, the obtained polymer has a high content of catalyst residues (generally more than 300 ppm of Ti). Such a high content of catalyst residues is detrimental to the final properties of the polymers, so as a deashing step is required for extracting the catalyst residues from the polymer. The deashing step is generally carried out in a deashing chamber by contacting the solution or slurry containing polybutene with caustic water. Afterwards, catalyst salts and water are separated from the polymeric phase by gravity in a settler: catalyst salts and water are then discharged from the settler, so that the content of catalyst residues in the polybutene solution or slurry is minimized. This deashing step involves the use of a large amount of liquids and increases the complexity of the reaction plant. Furthermore, a complete separation of the water from the polymeric phase is hardly achievable in the settling step and droplets of water remain unsettled in the polymer solution.

The above problems have been overcome by using a more recent generation of stereospecific Ziegler-Natta catalysts, which have been developed particularly for the production of isotactic polypropylene. These catalysts typically comprise a support of magnesium chloride combined with $TiCl_4$ and an electron donor, such as ethyl benzoate. The cocatalyst is again an aluminium alkyl, preferably an aluminium trialkyl compound. When α-olefins of three or more carbon atoms are polymerized in the presence of said catalysts, stereoregular polymers are obtained with a high polymerization yield. In view of the high activity, the content of catalyst residues in the polymerization product is drastically reduced. Generally the final polymer contains less than 20 ppm of Ti. As a consequence, the removal of catalyst residues from the polymer can be omitted, thus making simpler the process setup and reducing the operating costs.

However, a liquid-phase polymerization of butene-1 necessarily requires the separation of the obtained polybutene from the unreacted monomer. The monomer recovery is generally carried out in a separation step wherein high temperatures, of about 150–250° C., are required. Before such a separation step, a deactivation of the catalyst residues is therefore necessary in order to avoid an undesired modification of the properties of the final polymer due to a further uncontrolled polymerization and/or a thermal degradation of the polymer. Unless the catalyst is deactivated, the final pellets could have a higher melt index and a different molecular weight distribution with respect to the polymer obtained at the outlet of the polymerization step. Such a melt index shift should be prevented in order to obtain a final polymer having the desired properties.

The methods known in the art generally refer to a deactivation of the catalyst carried out by introducing a deactivator compound during the polymerization step. For instance, in a multi-stage polymerization process for producing an impact copolymer composition, the relative proportions of homopolymer phase and copolymer phase can be controlled by the addition of suitable catalyst deactivators, which kill or reduce the catalyst activity. Such catalyst deactivators are generally introduced at a point situated between the first and the second polymerization reactor or directly into the second polymerization reactor. An example of this deactivation method is given in EP 225 099 in which propylene-ethylene block copolymers having well-balanced qualities, such as high-impact properties, stiffness and processability, are said to be obtained by introducing a polyalkylene glycol ether as a catalyst deactivator between the first and second polymerization step. As a consequence of this addition, the catalyst activity in the second stage polymerization catalyst is reduced from 30% to 80%.

When a liquid-phase polymerization of an α-olefin has to be followed by the separation of the obtained polymer from the unreacted α-olefin, as for the polymerization of butene-1, the prior art teachings are not satisfactory in order to solve the problems correlated to the deactivation of the catalyst system.

It is known the use of low molecular weight gases or liquids in order to reduce the catalyst activity to a level where the polymerization stops. The use of water as a Ziegler-Natta catalyst killer is disclosed in U.S. Pat. No. 4,701,489 that refers to a method of deactivating catalyst residues in amorphous polyalphaolefins, such as amorphous propylene homo- and copolymers. After a bulk polymerization process and a separation of the unreacted monomers from the molten polyalphaolefin, a deactivation of the catalyst residues contained in the molten polyalphaolefin is described. According to the patent, the deactivation is carried out by contacting the molten amorphous polyalphaolefin with at least 3 moles of water per mole of aluminium present in the polymer.

Water and similar low-boiling compounds, such as $CO_2$ and alcohols, are recognized to be high-efficiency deactivators of Ziegler-Natta catalysts. However, when a liquid-phase polymerization of α-olefin is followed by a step for separating the obtained polymer from the unreacted α-olefin, these low boiling compounds will collect together with the unreacted monomer. As a consequence, a further separation between these deactivators and the unreacted α-olefin is necessary in order to avoid a feeding of the deactivator in the polymerization reactor and a consequent termination of the polymerization reaction. However, the above-mentioned compounds are generally not easily separable from the unreacted α-olefin. In fact, conventional distillation units are not sufficient to achieve an acceptable separation and molecular sieves must be provided in the monomer recovery section in order to capture these deactivators and to complete efficiently the separation. The use of molecular sieves increases the complexity of the process setup and the operating costs of the recovery section.

In view of the above drawbacks, an appropriate catalyst deactivation downstream a liquid-phase polymerization process for producing polyolefins should contemplate an easy separation of the deactivator from the unreacted monomer and, at the same time, should cause no modification of the desired properties of the obtained polyolefin.

It would be desirable to provide a liquid-phase process for polymerizing α-olefins wherein the catalyst residues are deactivated without causing any worsening in the final properties of the obtained polymer and improving the recovery of the monomer in the recovery section.

The Applicant has surprisingly found a liquid-phase process for polymerizing α-olefins, which combines the above advantages with a high efficiency in the deactivation of the catalyst residues.

It is an object of the present invention a liquid-phase process for polymerizing α-olefins of the formula $CH_2=CHR$, where R is H or an alkyl radical C1–C6, to produce a polymer that is soluble in the reaction medium, comprising the steps of:

a) continuously polymerising in liquid phase the α-olefin in the presence of a catalyst system based on a transition metal compound;
b) continuously withdrawing from step a) a solution of the polymer in the liquid reaction medium;
c) mixing in one or more mixing stages said solution of the polymer in the reaction medium with an organic deactivator having: at least a hydroxy group, a boiling point higher than 150° C., and a ratio between the molecular weight (MW) and the number of hydroxy groups ($n_{OH}$) comprised between 20 and 100.

Figure 1:
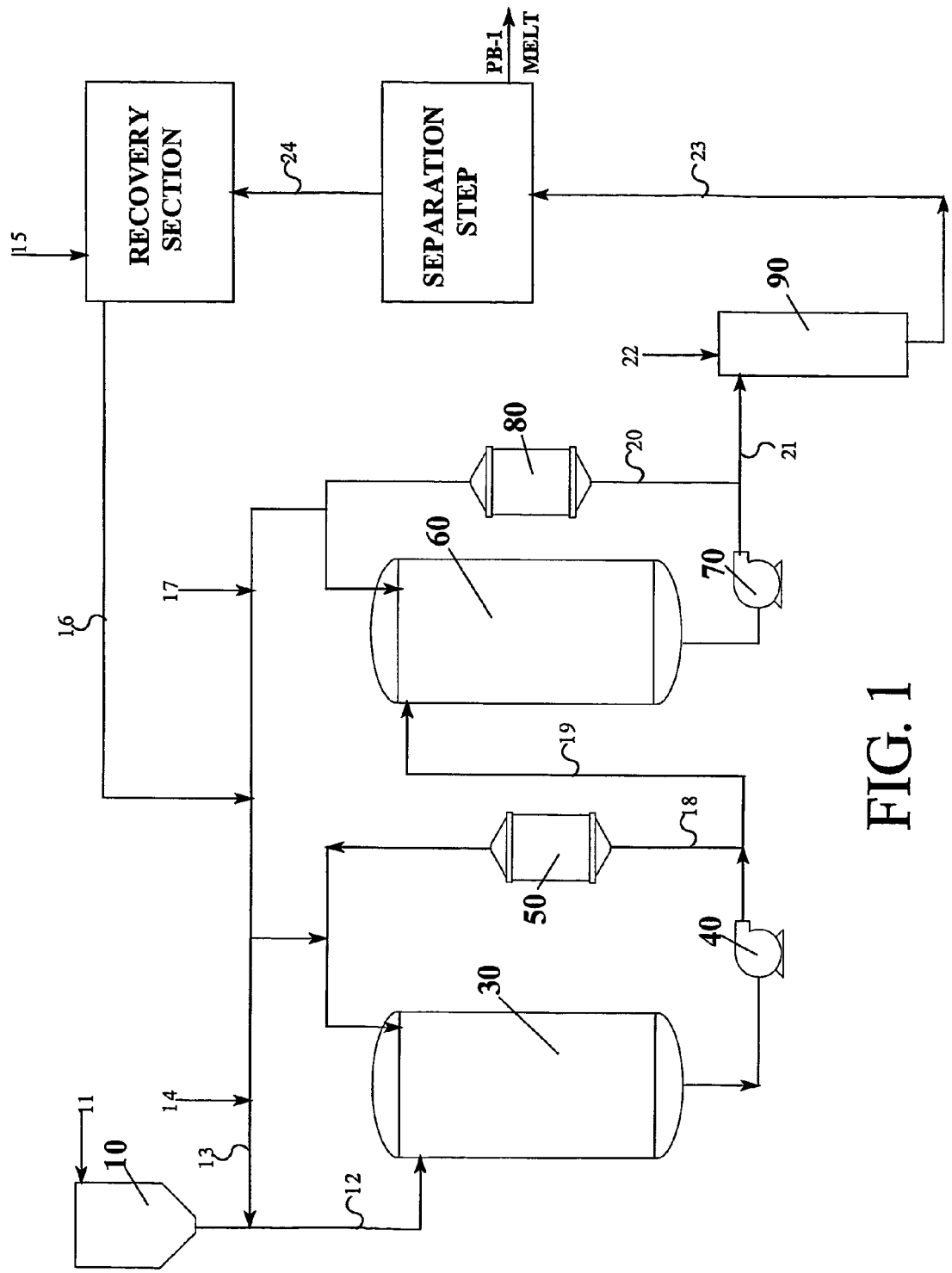
FIG. 1 is a schematic representation of a set-up for polymerization.

The process of the present invention will be described in detail with reference to a liquid-phase process for homo- or co-polymerizing butene-1, where in step a) the α-olefin is butene-1 and a solution of polybutene-1 (PB-1) in the reaction medium is obtained. The polymerization step a) takes place in liquid phase in the presence or absence of an inert hydrocarbon solvent. Suitable solvents can be liquid hydrocarbons having from 5 to 10 carbon atoms, such as pentane, hexane, heptane, octane, etc. Preferably liquid butene-1 is used as the reaction medium in the process of the invention: the solution process is feasible since polybutene-1 can dissolve in butene-1 at relatively low pressures. Furthermore, the two components of the solution perfectly mix together at the optimum working temperatures of Ziegler-Natta and metallocene catalysts. In order to obtain the best performance of the catalyst together with a complete miscibility of monomer and polymer, the polymerization temperature in step a) is generally kept at a value comprised in the range of from 65 to 85° C., while the pressure is generally comprised between 8 and 40 bar. Preferred operating conditions are at temperatures of from 70 to 80° C. and at a pressure comprised between 12 and 25 bar.

The presence of a highly active catalyst of the Ziegler-Natta or metallocene type is involved in step a). A high polymerization yield is thus achieved, in the order of 8–200 kg of PB-1 for gram of catalyst. Accordingly, the amount of catalyst residues in the obtained polybutene-1 is negligible, generally lower than 120 ppm, and do not adversely affect the quality of the final polymer. A product of high industrial value having an excellent hue and strength is obtained without carrying out any removal of the catalyst residues from the polymer.

It is preferred to carry out a pre-contact of the catalyst components in a pre-contacting pot. A transition metal compound, an aluminum alkyl compound and optionally an electron donor compound are brought into contact at a temperature lower than 60° C., preferably comprised between 0 and 20° C. The catalyst system formed in the pre-contacting pot is then transferred to the first polymerization reactor. Optionally a pre-polymerization step can be interposed between the pre-contact of the catalyst components and the polymerization reactor.

The polymerization step a) can be performed in one or more continuously stirred tank reactors, in which a high-viscosity polymeric solution of polybutene-1 in butene-1 is obtained. It is preferred to carry out the polymerization under such conditions that the concentration of the polymer in the solution does not become unduly high, as otherwise the polymeric solution would become too viscous and thus difficult to stir and/or to process. The concentration of polybutene-1 is suitably kept to a value of less than 35% by weight. In fact, a further increase of the polymer concentration would make the viscosity of the polymeric solution too high and the stirring device of the reactors could be blocked. Low concentrations are quite easy to process but uneconomic due to the low productivity of the plant and the high influence of utilities costs. Therefore, the polymerization is preferably conducted in such a way that the concentration of polybutene-1 in butene-1 is comprised between 10 and 30% by weight, more preferably between 20 and 30% by weight.

Optionally in step a) butene-1 may be polymerized in the presence of up to 20% by weight, preferably 0.5–10% by weight, based on butene-1, of another α-olefin. Suitable comonomers are, for instance, ethylene, propylene, pentene-1 and hexene-1.

In the case of multiple stirred reactors arranged in series, different working conditions can be adopted in each reactor, as regards the concentration of molecular weight regulator, monomer, comonomer. Accordingly, polybutene-1 of different average molecular weight can be obtained in each stirred reactor, thus leading to a final product having a broad molecular weight distribution (MWD). Hydrogen can be advantageously used to control the polymer molecular weight. The use of $H_2$ as a chain transfer agent increases the catalytic activity of the polymerization process.

The total residence time in polymerization step a) is generally comprised between 1 and 4 hours, preferably between 2 and 3 hours.

The above specified values of temperature must be maintained inside each reactor by means of a suitable cooling system. In order to balance the heat produced by the polymerization reaction, a heat exchange unit is placed along the recycle loop to the reactor. According to an embodiment, the solution of polybutene in butene-1 can be withdrawn from the bottom of the stirred reactor by means of a suitable pump for high viscosity fluids, such as a gear pump or a screw pump, and then the major portion thereof is passed through the heat exchanger unit to remove heat of reaction and returned to the reactor. The remaining portion is directly fed to the successive polymerization reactor.

At the outlet of the last stirred tank reactor, the obtained solution of PB-1 in butene-1 is transferred to the deactivation step c). It is important to point out that the deactivation step cannot be effected by a simple addition of the deactivator to the polymeric solution coming from the polymerization. This is a consequence of the remarkable difference existing between the viscosity of the killer compounds and the viscosity of the polymeric solution to be deactivated. In fact, the two streams differ in viscosity by several orders of magnitude: the viscosity of the polymeric solution is of about 1000–100000 cP, while the viscosity of the killer compounds is of about 1–100 cP. In view of such difference, the killer compounds can reach uniformly all the catalyst sites and thus deactivate efficiently the catalyst only if a vigorous and effective mixing of the components is provided. This intimate mixing can be achieved in one or more mixing tanks placed in series or, alternatively, in a single deactivation apparatus equipped with a sequence of more mixing stages where a high shear rate is established.

As above indicated (step c), the deactivator compounds of the present invention are compounds having a boiling point higher than 150° C. and at least a hydroxy group. In particular, they are characterized by a suitable ratio between the molecular weight (MW) and the number of hydroxy groups ($n_{OH}$) Said ratio MW/($n_{OH}$) should be comprised between 20 and 100, preferably between 30 and 70. Preferred deactivators satisfying the above requirements are, for example, propylen glycol, dipropylen glycol, glycerol, diethylen glycol and butandiol.

The catalyst system used in the polymerization step a) is preferably a Ziegler-Natta catalyst comprising a Ti-based compound as the solid catalyst component and an Aluminum alkyl compound as an activator. The deactivators of the invention show a high efficiency in deactivating such a catalyst system even if small amounts thereof are used. In fact, it is sufficient to use the above compounds with a ratio between moles of deactivator and moles of (Ti+Al) higher than $2/n_{OH}$, wherein $n_{OH}$ is the number of hydroxy groups of the deactivator compound. For instance, in the case of propylen glycol ($n_{OH}$=2) a molar ratio deactivator/(Ti+Al) higher than 1 should be provided. Preferably, the above-defined molar ratio is comprised between $3/n_{OH}$ and $6/n_{OH}$. The deactivator may be added as such or dispersed in a liquid medium, such as an aliphatic hydrocarbon.

According to a preferred embodiment of the present invention, a specific apparatus has been employed in order to ensure an intimate contact between the polymeric solution of PB-1 in butene-1 and the stream containing the deactivator compound. This apparatus comprises a stirring shaft provided with impellers in a number comprised between 2 and 20, preferably between 4 and 12: as a consequence, more mixing stages are formed along the shaft of the apparatus by the rotation of each impeller. The impellers are equipped with radial blades fixed at the stirring shaft, said radial blades causing a radial flow inside each mixing stage. The polymeric solution and the deactivator are continuosly fed at the inlet of this apparatus and slowly flow through the sequence of mixing stages. Said multistage vigorous stirring gives rise to a high-shear field, so that an intimate contact and mixing of the components are achieved: baffles are provided along the vertical wall of the apparatus in order to increase the shear rate. A radial flow is caused by the rotation of the blades, and simultaneously the polymeric solution moves along the shaft of the apparatus with a piston-like flow passing from a mixing stage to the successive one. Both the radial and axial flow contributes to improve the mixing of the components and, consequently the deactivation of the catalyst residues.

Besides providing a high efficiency in the deactivation of the catalyst components, thus preventing any further uncontrolled, undesired polymerization or polymer degradation downstream the polymerization reactor, the use of the deactivators compounds of the invention ensures other remarkable advantages which may be summarized as follow:

1) Differently from the known low-boiling deactivators, such as water, methanol, etc. these compounds are more easily separable from the unreacted butene-1 in the recovery section where the unreacted monomer is separated from the polymer.

2) Another remarkable property of these compounds reveals particularly suitable when the final polymer is aimed to be used in medical applications or in food packaging applications: most of these compounds comply with the provisions of the European Directive 90/128 and following amendments. As a consequence, the presence of them inside the final polymer after the pelletization is not detrimental for the use of the obtained polyolefin in the above-cited applications.

After the deactivation of the catalyst residues (step c), the solution of polybutene in butene-1 is passed to a separation step, wherein the polybutene-1 is separated from the unreacted monomer, which is recovered and re-circulated to the polymerization step a). The removal of the unreacted monomer from the polymer can be carried out according to methods known in the art. A melt devolatilization technique is preferably adopted, by means of one or more volatilization chambers operating at a decreasing pressure. For instance, two volatilizers placed in series can be used, the first one operating under pressure and the second one operating under vacuum: by this technique a polybutene melt substantially free of monomer is obtained. Afterwards, the polymer melt is compounded forcing it to flow inside a static mixer to which the master batch is added.

As regards the monomer recovery section, the gaseous phase separated from the polymer can contain, besides butene-1, also a little amount of the catalyst deactivators, so that the monomer recovery requires the separation of said compounds from butene-1. Generally, the above separation can be efficiently carried out by the use of two distillation units, thus preventing the introduction of the deactivators inside the polymerization reactors.

The above mentioned objects and advantages of the present invention will become evident from the following description of the accompanying drawings. It is to be understood that the enclosed drawings have only an illustrative purpose, not restrictive of the scope of the invention.

One preferred embodiment of the process of the invention is described in detail with reference to FIG. 1. A transition metal compound, an aluminum alkyl compound and optionally an electron donor compound are fed via line 11 to a pre-contacting pot 10. The catalyst system formed in the pre-contacting pot is then transferred via line 12 to a first continuosly stirred tank reactor 30 together with a stream 13 containing butene-1, hydrogen and optionally comonomers. Hydrogen and comonomers are fed to the reactors through line 14 and 17, while liquid butene-1 is introduced by means of lines 15 and 16. In particular, the monomer coming from the recovery section is provided by line 16, while fresh butene-1 is fed by line 15.

The polymerization step a) takes place in two continuously stirred tank reactors 30 and 60. The operating conditions in the two reactors are selected as above specified and a high-viscosity solution of polybutene-1 in butene-1 is formed in both the reactors.

Lines 14 and 17 can provide a different amount of $H_2$ as well as different types and amounts of comonomers, so that butene-1 (co)polymers with a different composition and different average molecular weight can be produced in the reactors 30 and 60. This 2-stage bimodal polymerization has the advantage of modulating the polymerization in the two reactors so as to produce a final product having the desired breadth of molecular weight distribution (MWD), also tailoring the other polymer properties, such as melting point, flexural modulus, etc.

The hydrogen concentration in the first reactor 30 is generally kept at a level lower than the hydrogen concentration in the second reactor 60. As a consequence, the first reactor produces butene-1 polymers having a melt flow index generally lower than the melt index of the polymers obtained in the second reactor.

The obtained solution of polybutene in butene-1 is withdrawn from the bottom of reactor 30 by means of a gear pump 40. A part of the polymeric solution is fed via line 18 to a heat exchanger 50 and then returned to reactor 30. The remaining part is directly fed via line 19 to the second polymerization reactor 60. The solution of polybutene in butene-1 is withdrawn from the bottom of reactor 60 by means of a gear pump 70: a part of the polymeric solution is fed via line 20 to a second heat exchanger 80 and then returned to reactor 60. The remaining part of the polymeric solution is directly fed through line 21 to the top of the deactivation apparatus 90 for the killing of the catalyst residues. At the same time, one or more deactivator compounds as defined in step c) of the process of the invention are continuously fed via line 22 to the top of the deactivation apparatus 90. The polymeric solution, once deactivated, is withdrawn from the bottom of the deactivation apparatus 90 and fed to the separation section via line 23. In the separation section a polybutene melt is separated from the unreacted monomer by means of two volatilization chambers (not shown in FIG. 1) operating at a decreasing pressure. Depending on their volatility, the deactivators of the invention are partially separated from the polymer together with the unreacted butene-1, thus following line 24. If not separated, they remain entrapped inside the polybutene-1 melt. The unreacted butene-1 is then separated by distillation from the deactivator compounds in the recovery section and then recycled to the polymerization step via line 16. The obtained polybutene-1 melt is then compounded with suitable additives and subjected to an underwater pelletization (not shown in FIG. 1). A preferred embodiment of the deactivation apparatus used in the process of the invention is shown in FIG. 2. The apparatus comprises a stirring shaft 1 provided with impellers equipped with radial blades 2. Mixing stages are formed along the shaft by the rotation of each impeller. Baffles 3 are provided along the vertical wall of the apparatus in order to increase the shear rate. The polymeric solution 4 and the deactivator 5 are continuously introduced at the top of the apparatus and slowly flow through the sequence of mixing stages. Together with the radial flow imposed by the rotation of the blades inside each mixing stage, also an axial piston-like flow is achieved along the shaft. The deactivated polymer solution 6 is withdrawn from the bottom of the apparatus and passed to the separation step.

The Ziegler-Natta catalysts used in the polymerization step a) comprise a titanium compound supported on magnesium chloride in active form and an alkylaluminum compound as the cocatalyst. When an internal electron-donor compound is used, also a high stereospecificity is achieved.

The preferred titanium compounds are $TiCl_4$ and $TiCl_3$. Also Ti-haloalcoholates of formula $Ti(OR)_{n-y}X_y$, where n is the valence of titanium and y is a number between 1 and n, can be used. The internal electron-donor compound may be selected from esters, ethers, amines and ketones. It is preferably selected from alkyl, cycloalkyl or aryl esters of monocarboxylic acids, for example benzoic acid, or polycarboxylic acids, for example phthalic or malonic acid, the said alkyl, cycloalkyl or aryl groups having from 1 to 18 carbon atoms. Examples of said electron-donor compounds are methyl benzoate, ethyl benzoate and diisobutyl phthalate. Generally, the internal electron donor compound is used in molar ratio with respect to the $MgCl_2$ of from 0.01 to 1, preferably from 0.05 to 0.5.

The alkyl aluminum compound is preferably chosen among trialkyl aluminum compounds, such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

The external donor can be of the same type or it can be different from the internal donor described above. Suitable external electron donor compounds include silicon compounds, ethers, esters, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane. The electron donor compound is used in such an amount to give a molar ratio between the organoaluminum compound and said electron donor compound of from 0.1 to 500, preferably from 1 to 300 and more preferably from 3 to 100.

The following examples have to be considered representative and non-limiting of the scope of the invention.

EXAMPLES

The following examples relate to some tests carried out in a pilot plant and aimed at evaluating the effectiveness of the deactivators of the present invention when used in a liquid phase process for polymerizing butene-1.

Figure 2:
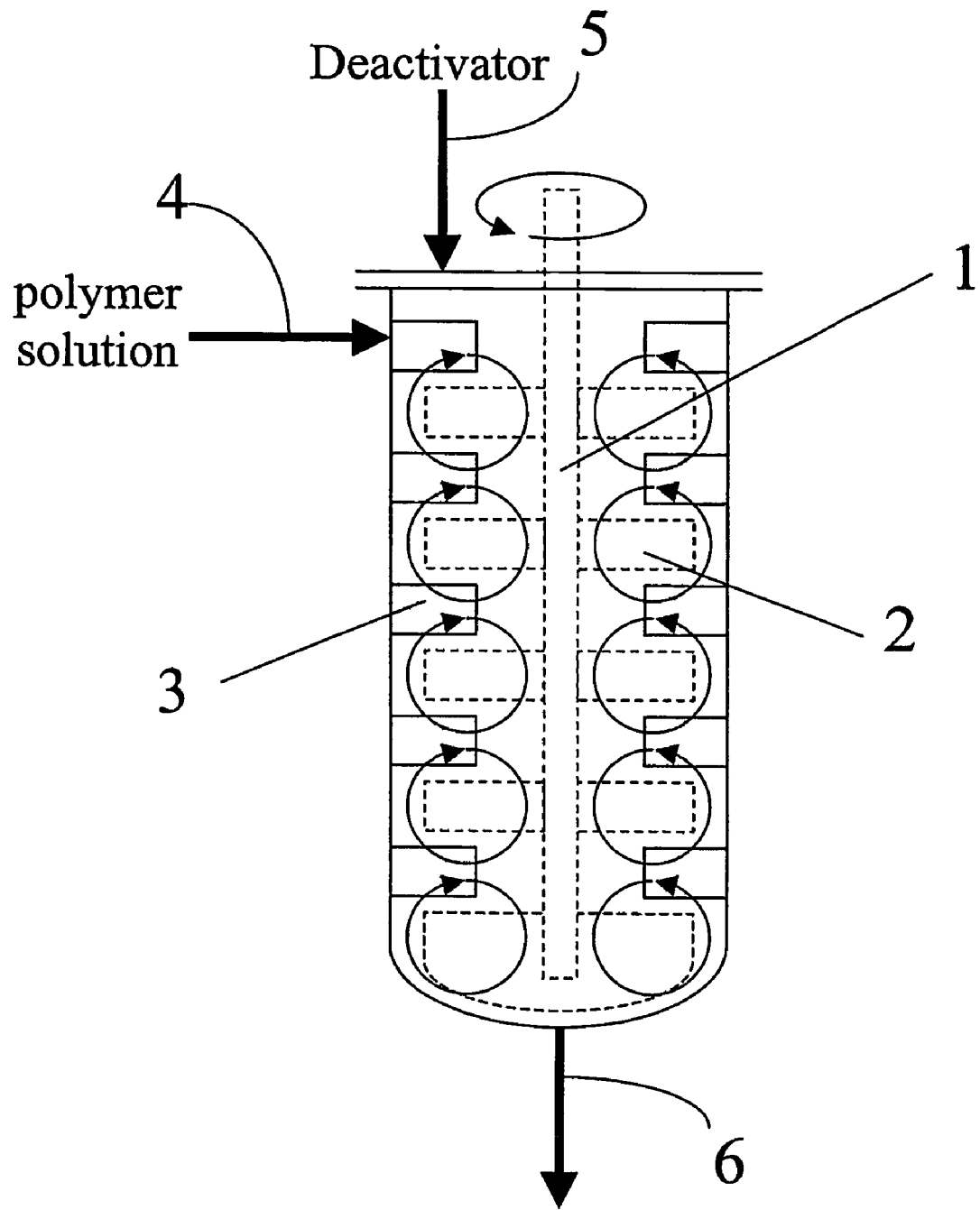
FIG. 2 is a schematic representation of a deactivation apparatus.

The polymerization tests were carried out into two continuously stirred tank reactors having a volume of 0.33 m$^3$ placed in series according to the embodiment of FIG. 1. The catalyst residues were deactivated in a deactivation apparatus according to the embodiment of FIG. 2.

The polymerization was carried out in the presence of a catalyst comprising:
    a solid catalyst component based on a Titanium compound;

triisobutylaluminum (TIBA) as a catalyst activator; thexyltrimethoxysilane as a donor compound.

The Melt Flow Index of the obtained polybutene-1 was measured by using a weight of 2.16 Kg at 190° C. according to ISO 1133 (ASTM D1238 condition E).

Preparation of the Solid Catalyst Component

Into a 500 ml four-necked round flask, purged with nitrogen, 225 ml of $TiCl_4$ were introduced at 0° C. While stirring, 6.8 g of microspheroidal $MgCl_2$ $2.7C_2H_5OH$ (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh $TiCl_4$ were added, the mixture was reacted at 120° C. for one hour, then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Example 1

Polymerization 0.5 g/h of the above solid catalyst component (corresponding to $0.15 \times 10^{-3}$ mol/h of Ti), 50 g/h of TIBA (corresponding to 0.25 mol/h of Al) and 0.3 g/h of thexyltrimethoxy-silane were pre-contacted in hexane at 15° C. for 10 minutes before the feeding to the first reactor. Liquid butene-1 together with $H_2$ as a molecular weight regulator were continuously fed to the polymerization reactors. The polymerization conditions in the first and second reactor are reported in Table 1 as well as the feeding ratio $H_2/C_4H_8$.

TABLE 1

| Polymerization conditions | -1$^{st}$ Reactor | 2$^{nd}$ Reactor |
|---|---|---|
| Temperature (° C.) | 70 | 75 |
| Pressure (bar) | 20 | 20 |
| Residence Time (min) | 160 | 80 |
| $H_2/C_4H_8$ (ppm weight) | 2 | 80 |

A solution of polybutene in butene-1 having a polymer concentration of 25% by weight was continuously withdrawn from the second reactor at a flow rate of 160 kg/h. This means a polymer production of 40 kg/h and a catalyst activity of 130 kg of polymer for each gram of solid catalyst component. A sample of polymeric solution was taken at the outlet of the second reactor in order to evaluate the Melt Flow Index of the obtained polybutene-1: a value of 0.40 was measured.

Deactivation

The solution of PB-1 in butene-1 was passed to the deactivation apparatus for the killing of the catalyst residues. Propylene glycol was used as a deactivator compound.

| Propylen glycol | $CH_3CH(OH)CH_2OH$ |
|---|---|
| Boiling point: | 185° C. |
| Molecular Weight (MW): | 76 |
| MW/$n_{OH}$: | 38 |

50 g/h of $CH_3CH(OH)CH_2OH$ (corresponding to 0.66 mol/h) were continuously fed to the top of the deactivation apparatus together with 160 kg/h of polymeric solution. The molar ratio between the propylene glycol and the moles of (Ti+Al) of the catalyst is 2.6.

Separation and Monomer Recovery

After the deactivation step, the solution of polybutene in butene-1 was heated up to 210° C. and then transferred into two devolatilization chambers placed in series, the first one operating at 6 bar, the second one operating at 50 mbar. Polybutene-1 melt with a negligible amount of monomer was withdrawn from the bottom of the second volatilizer, while a gaseous mixture containing butene-1 and propylene glycol was collected at the top of the first volatilizer.

The unreacted monomer was recovered by means of two distillation columns and then returned to the polymerization section. No change in the polymerization yield was observed.

At the outlet of the second volatilizer, the PB-1 melt was additivated with Irganox 1010 as an antioxidant compound and then transferred to an underwater pelletizer. The Melt Flow Index of the obtained pellets is 0.45. Accordingly, the process of the invention ensures a limited and negligible Melt Flow Index shift and combines a high polymerization yield with a high efficiency in the deactivation of the catalyst residues.

Example 2

Polymerization 0.18 g/h of the solid catalyst component (corresponding to $0.054 \ 10^{-3}$ mol/h of Ti), 46 g/h of TIBA (corresponding to 0.23 mol/h of Al) and 0.5 g/h of thexyltrimethoxy-silane were pre-contacted in hexane at 15° C. for 10 minutes before the feeding to the reactors. $H_2$ was used as a molecular weight regulator. Liquid butene-1 and ethylene were continuously fed to the polymerization reactors according to the feeding ratios reported in Table 2. The polymerization conditions in the first and second reactor are reported in Table 2.

TABLE 2

| Polymerization conditions | -1$^{st}$ Reactor | 2$^{nd}$ Reactor |
|---|---|---|
| Temperature (° C.) | 70 | 75 |
| Pressure (bar) | 24 | 24 |
| Residence Time (min) | 135 | 80 |
| $C_2H_4/C_4H_8$ (% wt) | 0.15 | 0.18 |
| $H_2/C_4H_8$ (ppm weight) | 11 | 200 |

A solution of a random copolymer (modified PB-1) in butene-1 having a polymer concentration of 17% by weight was continuously withdrawn from the second reactor at a flow rate of 155 kg/h. This means a polymer production of 26 kg/h and a catalyst activity of 140 Kg of polymer for each gram of solid catalyst component. A sample of polymeric solution was taken at the outlet of the second reactor in order to evaluate the Melt Flow Index of the obtained polybutene-1: a value of 0.75 was measured.

Deactivation

The solution of modified PB-1 in butene-1 was passed to the deactivation apparatus for the killing of the catalyst residues. 50 g/h of propylene glycol (corresponding to 0.66 mol/h) were continuously fed to the top of the deactivation apparatus together with 155 kg/h of polymeric solution. The molar ratio between the propylene glycol and the moles of (Ti+Al) of the catalyst is 2.86.

Separation and Monomer Recovery

The same operative conditions of Example 1 were carried out.

The unreacted butene-1 was recovered by means of two distillation columns and then returned to the polymerization section. No change in the polymeration yield was observed. At the outlet of the second volatilizer, PB-1 melt was withdrawn and transferred to the underwater pelletizer. The measure of the Melt Flow Index of the obtained pellets was of 0.85 so that a negligible MI shift was observed.

Example 3

Polymerization

The polymerization was carried out in a single continuously stirred tank reactor having a volume of 0.33 m$^3$.

0.25 g/h of the solid catalyst component (corresponding to 0.075 10$^{-3}$ mol/h of Ti), 38 g/h of TIBA (corresponding to 0.19 mol/h of Al) and 0.7 g/h of thexyltrimethoxy-silane were pre-contacted in hexane at 15° C. for 10 minutes. Liquid butene-1 together with H$_2$ as a molecular weight regulator were continuously fed to a polymerization reactor. The polymerization conditions are reported in Table 3.

TABLE 3

| Polymerization conditions | -1$^{st}$ Reactor |
|---|---|
| Temperature (° C.) | 75° C. |
| Pressure (bar) | 22 |
| Residence Time (min) | 180 |
| H$_2$/C$_4$H$_8$ (ppm weight) | 20 |

A solution of PB-1 in butene-1 with a concentration of 25% by weight was continuously withdrawn from the second reactor at a flow rate of 60 kg/h. This means a polymer production of 15 kg/h and a catalyst activity of 60 kg of polymer for each gram of solid catalyst component. A sample of polymeric solution was taken at the outlet of the second reactor in order to evaluate the Melt Flow Index of the obtained polybutene-1: a value of 0.40 was measured.

Deactivation

The solution of PB-1 in butene-1 was passed to the deactivation apparatus for the killing of the catalyst residues. Dipropylen glycol was used as a deactivator compound.

| Dipropylen glycol | HOC$_3$H$_6$OC$_3$H$_6$OH |
|---|---|
| Boiling point: | 230° C. |
| Molecular Weight (MW): | 134 |
| MW/n$_{OH}$: | 67 |

88.4 g/h of dipropylen glycol (corresponding to 0.66 mol/h) were continuously fed to the top of the deactivation apparatus together with 160 kg/h of polymeric solution. The molar ratio between the propylene glycol and the moles of (Ti+Al) of the catalyst is 3.5.

Separation and Monomer Recovery

The same operative conditions of Example 1 were carried out.

The unreacted monomer was recovered by means of two distillation columns and then returned to the polymerization section. No change in the polymerization yield was observed.

At the outlet of the second volatilizer, PB-1 melt was withdrawn and transferred to an underwater pelletizer. The measure of the Melt Flow Index of the obtained pellets was of 0.50 so that a negligible MI shift was observed.

Example 4 (Comparative)

Polymerization

The polymerization of butene-1 was carried out according to the same conditions of example 1. A sample of polymeric solution was taken at the outlet of the second reactor and a melt flow index of 0.40 was measured.

Deactivation

The polymeric solution withdrawn from the second reactor was not subjected to any deactivation treatment of the catalyst residues.

Separation and Monomer Recovery

The same operative conditions of Example 1 were carried out. At the outlet of the second volatilizer polybutene-1 melt was transferred to the underwater pelletizer.

The melt index of the obtained pellets was 3.0, so that an unacceptable shift of the melt index was observed. This example proves that a liquid-phase polymerization of butene-1 must be followed by a deactivation treatment of the catalyst residues to avoid, during the separation step, uncontrolled and undesired side reactions or a polymer degradation, which can modify the final structure of the polymer.

Example 5 (Comparative)

Polymerization

The polymerization of butene-1 was carried out according to the same conditions of example 1, so that a value of MIE=0.40 was measured at the outlet of the second reactor.

Deactivation

The solution of PB-1 in butene-1 was passed to the deactivation apparatus for the killing of the catalyst residues. As a deactivator, a mixture of alkyldiethanolamines of formula R—N(CH$_2$CH$_2$OH)$_2$ wherein R is an alkyl radical C$_{12}$–C$_{18}$ was used (ATMER 163 traded by Atlas Chemical Industries).

| Mixture of alkyldiethanolamines | R—N(CH$_2$CH$_2$OH)$_2$ | R = C$_{12}$–C$_{18}$ |
|---|---|---|
| Molecular Weight (MW): | 271–357 | |
| MW/n$_{OH}$: | 135–178 | |

0.66 mol/h of Atmer 163 were continuously fed to the top of the deactivation apparatus together with 160 kg/h of polymeric solution. The ratio between the moles of Atmer 163 and the moles of (Ti+Al) is 2,6.

Separation and Monomer Recovery

The same operative conditions of Example 1 were carried out.

At the outlet of the second volatilizer polybutene-1 melt was transferred to the underwater pelletizer. The melt index of the obtained pellets was 1.0 so that a considerable shift of the melt index was observed. Moreover, it was detected an amount of about 3,000 ppm (weight) of the above deactivator in the PB-1 pellets. Such amount is generally not acceptable in all the applications where a polymer with a high degree of purity is requested. This example proves that compounds having a ratio MW/n$_{OH}$ higher than 100 is not suitable to kill the catalyst residues contained in a polymeric solution obtained from a liquid-phase polymerization of butene-1.

The deactivation conditions, as well as the values of Melt Index E in the examples 1–5 are reported in Table 4, wherein the Melt index at the outlet of the polymerization step is indicated with MIE$^{(A)}$, while the Melt Index of the final pellets is indicated with MIE$^{(B)}$.

Example 6

Polymerization

The polymerization of butene-1 was carried out according to the same conditions of example 1, so that a value of MIE=0.40 was measured at the outlet of the second reactor.

Deactivation

The solution of PB-1 in butene-1 was passed to the deactivation apparatus for the killing of the catalyst residues. As a deactivator 1,3-Butanediol was used.

| | |
|---|---|
| 1,3-Butanediol | CH$_3$CHOHCH$_2$CH$_2$OH |
| Boiling point | 207° C. |
| Molecular Weight (MW): | 90 |
| MW/n$_{OH}$: | 45 |

70 g/h of 1,3-Butanediol (corresponding to 0.77 mol/h) were continuously fed to the top of the deactivation apparatus together with 160 kg/h of polymeric solution. The ratio between the moles of 1,3-Butanediol and the moles of (Ti+Al) is of about 3.1.

Separation and Monomer Recovery

The same operative conditions of Example 1 were carried out.

The unreacted butene-1 was recovered by means of two distillation columns and then returned to the polymerization section. No change in the polymeration yield was observed. At the outlet of the second volatilizer, PB-1 melt was withdrawn and transferred to the underwater pelletizer. The measure of the Melt Flow Index of the obtained pellets was of 0.48 so that a negligible MI shift was observed.

The deactivation conditions, as well as the values of Melt Index E of examples 1–6 are reported in Table 4, wherein the Melt Index at the outlet of the polymerization step is indicated with MIE$^{(A)}$, while the Melt Index of the final pellets is indicated with MIE$^{(B)}$.

TABLE 4

| | Deactivator | Deactiv/ Ti + Al (mol) | MW/n$_{OH}$ | MIE$^{(A)}$ | MIE$^{(B)}$ |
|---|---|---|---|---|---|
| Ex. 1 | Propylene Glycol | 2.6 | 38 | 0.40 | 0.45 |
| Ex. 2 | Propylene Glycol | 2.86 | 38 | 0.75 | 0.85 |
| Ex. 3 | Dipropylene Glycol | 3.5 | 67 | 0.40 | 0.50 |
| Ex. 4 (comp) | — | — | — | 0.40 | 3.0 |
| Ex. 5 (comp) | Alkyldiethanolamines | 2.6 | 135–178 | 0.40 | 1.0 |
| Ex. 6 | 1,3-Butanediol | 3.1 | 45 | 0.40 | 0.48 |

The invention claimed is:

1. A liquid-phase process for polymerizing at least one α-olefin of formula CH$_2$=CHR, wherein R is H or a C$_1$–C$_6$ alkyl radical, comprising the steps of:
   continuously polymerizing in a liquid reaction medium the α-olefin with a catalyst system comprising at least one transition metal compound;
   continuously withdrawing a solution of liquid reaction medium soluble polymer;
   mixing in one or more mixing stages the solution of liquid reaction medium soluble polymer with an organic deactivator having at least one hydroxy group, and a boiling point higher than 150° C., wherein a ratio of the molecular weight (MW) of the organic deactivator to the hydroxy group (n$_{OH}$) of the organic deactivator is between 20 and 100.

2. The process according to claim 1, wherein the α-olefin is butene-1.

3. The process according to claim 2, wherein a solution of polybutene-1 is in the liquid reaction medium and is continuously obtained.

4. The process according to claim 3, wherein the liquid reaction medium is liquid butene-1.

5. The process according to claim 1, wherein the α-olefin is continuously polymerizing in the liquid reaction medium at a temperature from 65 to 85° C.

6. The process according to claim 1, wherein the α-olefin is continuously polymerizing in the liquid reaction medium at a pressure between 8 and 40 bar.

7. The process according to claim 1, wherein the α-olefin is continuously polymerizing in the liquid reaction medium in at least one continuously stirred tank reactor.

8. The process according to claim 4, wherein a concentration of polybutene-1 in butene-1 is kept to a value of less than 35% by weight in the liquid reaction medium.

9. The process according to claim 8, wherein the concentration of polybutene-1 in butene-1 is between 10 and 30% by weight in the liquid reaction medium.

10. The process according to claim 1, wherein butene-1 is polymerized with up to 20% by weight based on butene-1, of an α-olefin other than butene-1.

11. The process according to claim 1, wherein the ratio of the molecular weight (MW) of the organic deactivator to the hydroxy group (n$_{OH}$) of the organic deactivator is between 30 and 70.

12. The process according to claim 1, wherein the organic deactivator is selected from propylene glycol, dipropylene glycol, glycerol, diethylene glycol, and butanediol.

13. The process according to claim 1, wherein the catalyst system is a Ziegler-Natta catalyst comprising a Ti-containing compound as a solid catalyst component and an Aluminum alkyl compound as an activator.

14. The process according to claim 13, wherein a molar ratio of the organic deactivator/(Ti+Al) is higher than 2/n$_{OH}$.

15. The process according to claim 14, wherein the molar ratio is between 3/n$_{OH}$ and 6/n$_{OH}$.

16. The process according to claim 1, wherein mixing in one or more mixing stages the solution of liquid reaction medium soluble polymer with the organic deactivator is carried out in one or more mixing tanks placed in series.

17. The process according to claim 1, wherein mixing in one or more mixing stages the solution of liquid reaction medium soluble polymer with the organic deactivator is carried out in a single deactivation apparatus further comprising a sequence of mixing stages.

18. The process according to claim 17, wherein the single deactivation apparatus further comprises a stirring shaft comprising between 2 and 20 impellers.

19. The process according to claim 18, wherein the mixing stages are formed along the stirring shaft by rotating the impellers.

20. The process according to claim 18, wherein the impellers comprise radial blades fixed at the stirring shaft, the radial blades causing a radial flow inside each mixing stage.

21. The process according to claim 17, wherein the solution of liquid reaction medium soluble polymer and the organic deactivator are continuously fed at an inlet of the deactivation apparatus and flow slowly through the sequence of mixing stages.

22. The process according to claim 4, further comprising passing a solution of polybutene-1 in butene-1 to a separation step, wherein the polybutene-1 is separated from unreacted monomer, which is recovered and re-circulated.

23. The process according to claim 22, wherein the separation step is carried out by melt devolatilization by means of one or more volatilization chambers operating at a decreasing pressure.

24. The process according to claim 10, wherein butene-1 is polymerized with 0.5 to 10% by weight based on butene-1, of an α-olefin other than butene-1.

* * * * *

UNITED STATES PATENT AND TRADEMARK OFFICE
CERTIFICATE OF CORRECTION

PATENT NO. : 7,160,964 B2  Page 1 of 1
APPLICATION NO. : 10/518885
DATED : January 9, 2007
INVENTOR(S) : Daniele Bigiavi et al.

It is certified that error appears in the above-identified patent and that said Letters Patent is hereby corrected as shown below:

At col. 14, line 10, after "polymer;" insert --and--

At col. 14, line 11, before "mixing" insert --after the solution of liquid reaction medium soluble polymer is withdrawn,--

Signed and Sealed this

Second Day of September, 2008

JON W. DUDAS
*Director of the United States Patent and Trademark Office*